(No Model.)
J. F. A. EDWARDS.
ONION SLICER.
No. 461,821. Patented Oct. 27, 1891.
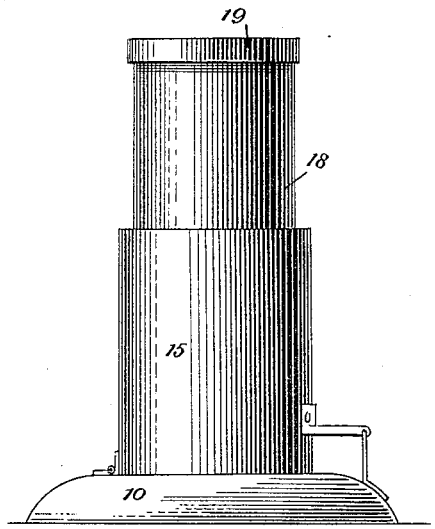
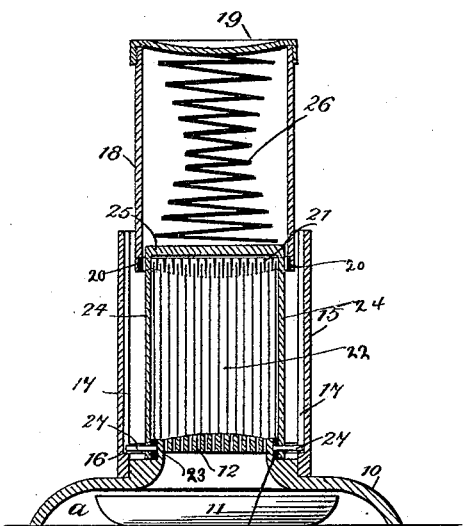
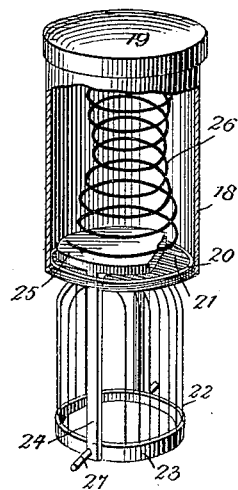
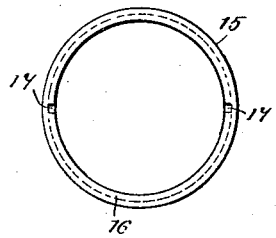
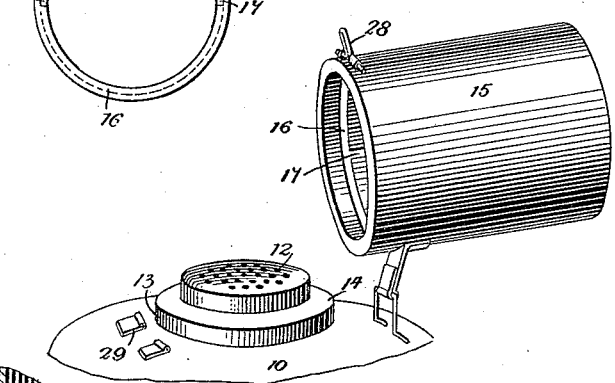
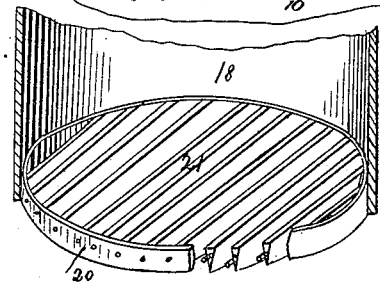
WITNESSES:
INVENTOR:
J. F. A. Edwards
BY
Munn & Co.
ATTORNEYS

UNITED STATES PATENT OFFICE.

JOHN F. A. EDWARDS, OF BUSHIRE, PERSIA.

ONION-SLICER.

SPECIFICATION forming part of Letters Patent No. 461,821, dated October 27, 1891.

Application filed September 13, 1890. Serial No. 364,824. (No model.)

*To all whom it may concern:*

Be it known that I, JOHN FREDERICK AUGUSTUS EDWARDS, of Bushire, Persia, have invented a new and useful Improvement in Onion-Slicers, of which the following is a full, clear, and exact description.

My invention relates to an improvement in machines for slicing onions, and has for its object to provide a machine of simple and economic construction whereby an onion or a similar vegetable or fruit may be sliced, minced, or crushed to extract the juices therefrom; and a further object of the invention is to provide a machine by which onions may be sliced without any of the odors escaping.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the machine. Fig. 2 is a central vertical section through the entire machine. Fig. 3 is a partial perspective view and section of the upper cylinder of the machine and its attached parts. Fig. 4 is a perspective view of the base and the lower cylinder, the latter being represented as thrown back. Fig. 5 is a plan view of the lower cylinder; and Fig. 6 is a vertical section of a portion of the sliding cylinder or casing, the mincing-knives being shown in perspective. Fig. 7 is an enlarged cross-sectional view through the series of knives and through the bows of the cage.

The base 10 is dished upon its under surface, as illustrated at *a* in Fig. 2, whereby a receptacle 11—of the nature of a saucer, for instance—may be placed beneath the central portion of the base. The base 10 is higher at its center than at any other point, and the central face of the base, which is slightly concaved at the upper face, is provided with a series of apertures or openings 12. The apertured portion, which is the highest portion of the base, constitutes a table, and is preferably circular in contour and made of box-wood or some other material not liable to injure the edges of the blades hereinafter described, and between the base proper and the apertured table an annular rib or flange 13 is constructed, forming a shoulder 14, as is best shown in Fig. 4.

Upon the base, at one side of the table, a hollow cylinder 15 is hinged, the said cylinder being open at top and bottom and so connected with the base that when carried to a vertical position it will conceal the table 12 and shoulder 14, the bottom of the cylinder being made to rest upon that portion of the upper face of the base contiguous to the flange 13, as illustrated in Figs. 1 and 2. In the inner wall of the cylinder, near its lower end, a circumferential groove or channel 16 is produced, and at opposite sides of the inner wall of the said cylinder vertical diametrically-opposite grooves or channels 17 are formed. The grooves or channels 17 commence at the top of the cylinder and terminate at their intersection with the circumferential groove 16. A second cylinder 18, of smaller diameter than the lower cylinder, is adapted to slide in the latter. The smaller cylinder 18 is also hollow, but is closed at its upper end, preferably by a screw-cap 19, the upper face of which is ordinarily slightly concaved or dished. A ring 20 is attached within the upper cylinder 18 at its lower end, and the said ring is provided with a series of transversely-arranged knives 21.

In connection with the upper or smaller cylinder 18 a wire cage 22 is employed, which consists in a series of parallel bows or staples, the lower ends of the legs of which are secured to a base-ring 23, and upon the outer face of the ring 23 diametrically-opposite vertical straps 24 are secured, which straps lead upward beyond the top of the cage, between the ring 20 and the outer knives 21, as is best illustrated in Fig. 3. The two straps 24 are preferably made integral with a disk 25, which disk is located above the knives.

Within the upper cylinder 18 a spring 26 is located, preferably a coiled spiral spring, the upper end of which spring has a bearing against the screw-cap 19, while the lower end has a bearing upon and is attached to the upper face of the disk 25.

In operation the onion or other article to be sliced is placed upon the apertured table 12, the cylinders having been previously thrown back to uncover said table. If the upper cylinder is detached from the lower cylinder, the lower cylinder is thrown over upon the base to assume its normal or vertical position, and the upper cylinder, with its attached cage, is introduced into the lower cylinder in the following manner: At the lower end of each of the straps 24 a horizontal pin or stud 27 is located. These pins 27 are made to enter the vertical groove 17 of the lower cylinder, and the upper cylinder is pressed downward until the pins enter the circumferential groove or channel 16, whereupon the upper cylinder is given about a half-turn, which carries the pins out of alignment with the vertical grooves. Pressure is then exerted upon the cap 19 of the upper cylinder, the hand of the operator being the preferred medium, and the upper cylinder is thereby forced down against the tension of the spring 26, and as the knives are carried downward with the cylinder they pass between the bows or staples of the cage 22, and when they come in contact with the article to be sliced the said article is cut into a number of pieces. As soon as the upper cylinder is released from pressure the spring returns it to its normal position, and as the knives are compelled to pass up through the cage they are cleared by the upper ends or crosspieces of the bows or staples from any particles that may have adhered to them. In order to mince an onion, for instance, the upper cylinder is turned until the knives and the cage are at a right angle to their former position. A suitable stop may be located within the lower cylinder to determine the correct position of the knives under these circumstances, and when the upper cylinder is again pressed downward the knives will cut transversely through the fruit or vegetable at a right angle to the former cut, thus dividing the article into a number of small particles. To extract the juice after the fruit or vegetable has been minced or sliced, the upper cylinder is removed from the lower cylinder and replaced therein in a reversed position—that is, with the cap 19 undermost. By placing a board or other suitable article upon the ring 23, which will be exposed to view, and pressing down upon said board the cap 19 will be forced down upon the minced or sliced fruit or vegetable and the juices forced to pass through the apertures of the base-table into a receptacle placed beneath the base to receive the juice. In order that the lower cylinder may be fastened firmly to the base, the cylinder may be provided with a staple 28, adapted to enter a space between apertured lugs 29, attached to the base, the staple and lugs being connected in any approved manner.

Having thus described my invention, I claim as new and desire to secure by Letters Patent—

1. A device of the character described, comprising a table, a casing removably held thereon, a spring-pressed plunger held to slide in the casing, knives secured to the lower end of the plunger, and a cage to inclose the vegetable or fruit and formed of a series of parallel bows or staples between which the knives reciprocate, substantially as described.

2. A device of the character described, comprising a table, a casing removably attached to the table, a spring-pressed plunger capable of vertical and rotary movement in the casing, knives attached to one end of the plunger, and a cage adapted to turn with the plunger and to inclose the vegetable or fruit, and consisting in a series of parallel bows or staples between which the knives reciprocate, substantially as set forth.

3. In a device of the character described, the combination, with a base and a cylinder hinged to the said base, open at both ends, and adapted to rest thereon, of a spring-pressed upper cylinder held to slide in the lower cylinder, and knives secured in the lower end of the said upper cylinder, substantially as shown and described, and for the purpose specified.

4. In a device of the character described, the combination, with a base provided with a central table and a hinged cylinder open at both ends and adapted to cover the said table, of an upper smaller spring-pressed cylinder held to slide in the larger cylinder, knives diametrically arranged in the lower end of the spring-pressed cylinder, and a cage surrounding the table of the base, through which cage the knives of the upper cylinder pass, as and for the purpose specified.

5. In a device of the character described, the combination, with a hollow base provided with an apertured central table, a cylinder open at both ends, hinged to the base, and adapted to conceal the table, provided with diametrically-opposite vertical grooves, and a connecting circumferential groove, of an upper spring-pressed cylinder held to slide in the lower cylinder, knives diametrically attached in the lower end of the spring-pressed cylinder, and a cage, formed of parallel bows or staples, surrounding the table and provided with attached pins capable of entering the grooves of the lower cylinder, the knives of the upper cylinder being adapted to pass between the bows or staples, as and for the purpose specified.

6. In a device of the character described, the combination, with a hollow base having a central table, a cylinder hinged to the base, adapted to fall down over the table, and provided with inner longitudinal grooves, and a connecting circumferential groove, of a smaller cylinder adapted to slide in the lower cylinder, a cap closing the upper end of the upper cylinder, knives diametrically arranged in the lower end of said upper cylinder, a disk located above the knives, straps projected downward from the disk and provided with guide-pins adapted to enter the grooves of the lower cylinder, a cage, formed of parallel bows or staples, surrounding the base-table and attached to the straps of the disk, and a spring located between the cap of the upper cylinder and the disk above the knives thereof, substantially as shown and described, and for the purpose specified.

JOHN F. A. EDWARDS.

Witnesses:
MAHOMED RHÁN,
BAPTISTA C. D'COSTA.